(12) United States Patent
Nakashima

(10) Patent No.: US 7,081,224 B2
(45) Date of Patent: *Jul. 25, 2006

(54) POLYMER FILM PRODUCING METHOD (75) Inventor: Hiroshi Nakashima, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 107 days.

This patent is subject to a terminal disclaimer.

(21) Appl. No.: 10/944,768

(22) Filed: Sep. 21, 2004

(65) Prior Publication Data
US 2005/0062204 A1 Mar. 24, 2005

(30) Foreign Application Priority Data
Sep. 22, 2003 (JP) .............................. 2003-330694

(51) Int. Cl.
B29C 39/14 (2006.01)
B29C 49/00 (2006.01)
B29C 47/76 (2006.01)
B29C 49/08 (2006.01)
B29C 55/00 (2006.01)

(52) U.S. Cl. ...................... 264/555; 264/571; 264/101; 264/212; 264/216; 264/288.4; 264/290.2; 264/291

(58) Field of Classification Search ................ 264/555, 264/571, 101, 212, 216, 288.4, 290.2, 291
See application file for complete search history.

(56) References Cited

U.S. PATENT DOCUMENTS 3,696,475 A * 10/1972 Fleissner ........................ 26/92
3,874,043 A 4/1975 Holm
6,582,645 B1 * 6/2003 Takeda ........................ 264/207
6,702,283 B1 3/2004 Berlingen et al.

FOREIGN PATENT DOCUMENTS

JP 62-115035 A 5/1987
JP 9-85680 A 3/1997

* cited by examiner

Primary Examiner—Stephen J. Lechert, Jr.
(74) Attorney, Agent, or Firm—Sughrue Mion, PLLC (57) ABSTRACT A solution casting system has a tentering device, and produces polymer film of cellulose triacetate. Two web edge portions of the polymer film are sucked within a section from a downstream end of the tentering device to a first roller that the polymer film contacts first. Furthermore, the two web edge portions are subjected to blowing of gas, or suction, between the first roller and a second roller positioned next downstream from the first roller. Each range of two web edge portions has an effective size in a web width direction less than 25% of that of the polymer film.

12 Claims, 10 Drawing Sheets

POLYMER FILM PRODUCING METHOD

BACKGROUND OF THE INVENTION

1. Field of the Invention

The present invention relates to a polymer film producing method. More particularly, the present invention relates to a polymer film producing method in which polymer film traveling from a tentering device can be free from unwanted deformation harmful to high quality as a product.

2. Description Related to the Prior Art

Polymer film, for example cellulose ester film, is produced by solution casting. A die for casting is used to cast dope or solution of polymer on to a support, to form polymer film. The polymer film is stripped from the support, and dried and wound as a web roll of the product film.

JP-A 62-115035 discloses a tentering device. After the polymer film stripped from the support, the tentering device dries the polymer film being transported for the purpose of regulation of the web width or polymer film width, and stretching. This is to raise a flat characteristic, mechanical strength, and optical characteristic of the polymer film.

Examples of the tentering device include a clip type and a pin type according to a difference in the manner of retaining web edge portions of the polymer film. In the clip type, tenter clip mechanisms retain the web edge portions at points positioned internal from edge lines of the polymer film. A polymer film width of the polymer film is regulated by an adjusted orbit and speed of movement. Also, the tenter clip mechanisms apply tension to the web edge portions in the stretching direction.

Internal portions stretched between the web edge portions will not curl because of the tension. However, large curls occur in the web edge portions of the polymer film positioned outside the tenter clip mechanisms. A term of web edge curls is used for this herein. The portions directly contacted by the tenter clip mechanisms are considerably loose, because of not being dried or shrunken.

After the polymer film is released from the tenter clip mechanisms, rollers guide the polymer film being transported. According to the known techniques, it is likely that wrinkles occur on the polymer film in contact with the rollers, due to a difference in the tension between a middle portion and the web edge portions of the polymer film in the direction of the polymer film width. Furthermore, web edge folds or wrinkles are likely to occur continuously or continually upon contact of the web edge curls with the rollers. The polymer film may be broken into pieces if the web edge folds or wrinkles increase to a considerable extent.

Let a term of a releasing position stand for a position where the polymer film is released from the retention of the tenter clip mechanisms. It is effective to reduce a distance between the releasing position and one of the rollers positioned next downstream from the releasing position, and also to reduce a wrap angle of at least one of the rollers in contact with the polymer film in a section downstream from the releasing position. In view of this, JP-A 9-085680 discloses a method in which the web edge curls are kept free from contact with the rollers by reducing a length of the rollers to a value under the polymer film width in a section downstream from the releasing position. Also, a known method suggests slitting away of the web edge curls by use of a cutter or the like. Also, it is conceivable to change a surface roughness and material of the rollers to facilitate slips of the polymer film. This is effective in keeping the web edges decurled.

In relation to the method of reducing the distance from the releasing position to the rollers, the reduction may be impossible to such an extent as to obtain sufficient effects. This is because devices in the system are not suitable for the distance reduction. Also, the rollers must support the polymer film in the entirety of the polymer film width, and must have a diameter in a limited range.

The method of reducing the wrap angle has a problem in that frequent occurrence of the web edge folds or wrinkles. The degree of freedom in disposition of the rollers is low in consideration of the installing structure or space. The wrap angle cannot be determined suitably for practical reasons. Also, the characteristic of the slip of the polymer film causes a problem in likeliness of scratching the polymer film or in creating a zigzag movement of the polymer film.

Also, a problem arises in the method of reducing the length of the rollers, as the traveling of the polymer film will be very unstable, and because the length reduction cannot be applied to one of the rollers positioned on borderlines between the processes or stations due to the sealing function of the roller. Furthermore, a problem lies in the slitting away for decurling. If removal of the web edge portions from the polymer film is intended before a first contact of the polymer film with the rollers, slitting is extremely difficult due to the considerable corrugated form of the web edge portions. Typically when a space for the tentering device is filled with inert gas, operators cannot enter the space for the system. This makes it very difficult to determine or adjust settings of the system, as external management for the unmanned control is required structurally.

Measures conceived so far to solve the problems result in moderating the drying condition, blocking reduction in the film thickness of the polymer film, and blocking enlargement in the polymer film width. No known solutions are consistent to raising productivity or conceiving new products.

SUMMARY OF THE INVENTION

In view of the foregoing problems, an object of the present invention is to provide a polymer film producing method in which web edge portions of polymer film traveling from a tentering device can be free from web edge curls or other unwanted deformation harmful to high quality as a product.

In order to achieve the above and other objects and advantages of this invention, a polymer film producing method, of producing polymer film by use of a solution casting system including a tentering device, is provided. There is a step of blowing gas in, or sucking, a film surface of at least one of web edge portions of the polymer film within a section from a downstream end of the tentering device to a first roller that the polymer film contacts first.

Furthermore, the producing method has a step of blowing gas in, or sucking, the at least one web edge portion between the first roller and a second roller positioned next downstream from the first roller in a transporting direction of the polymer film.

The at least one web edge portion has an effective size in a web width direction for being blown or sucked smaller than 25% of a polymer film width of the polymer film.

In one preferred embodiment, the at least one web edge portion has the effective size smaller than 15% of the polymer film width.

The blowing or the sucking is simultaneous between the web edge portions.

The polymer film moves out of the tentering device at a moving speed equal to or more than 45 m/min.

The polymer film has the polymer film width equal to or more than 1,400 mm and equal to or less than 1,800 mm in moving out of the tentering device.

The polymer film has a film thickness equal to or more than 20 microns and equal to or less than 120 microns in moving out of the tentering device.

The polymer film comprises cellulose ester film.

The tentering device includes a pair of tenter clip mechanisms for retaining respectively the web edge portions to tenter the polymer film. The blowing or the sucking is for removing influence of looseness of the web edge portions, to prevent a curl or wrinkle.

An upper film surface of the polymer film is sucked.

Furthermore, gas is blown in the upper film surface of the web edge portions between the first roller and a second roller positioned next downstream from the first roller in a transporting direction of the polymer film.

In another preferred embodiment, furthermore, the upper film surface of the web edge portions is sucked between the first roller and a second roller positioned next downstream from the first roller in a transporting direction of the polymer film.

In still another preferred embodiment, an upper film surface of the polymer film is blown with the gas.

In one preferred embodiment, a lower film surface of the polymer film is sucked.

Furthermore, the lower film surface of the web edge portions is sucked between the first roller and a second roller positioned next downstream from the first roller in a transporting direction of the polymer film.

The sucking is through plural suction nozzles or openings arranged close to one another.

In another preferred embodiment, the blowing is through plural slit-shaped blowing nozzles disposed respectively to extend crosswise to a transporting direction of the polymer film.

A polymer film producing method includes forming polymer film by solution casting. The polymer film is tentered by a tentering device. There is a step of blowing gas in, or sucking, at least one of web edge portions of the polymer film between the tentering device and a first roller positioned next downstream from the tentering device in a transporting direction of the polymer film. Also, there is a step of blowing gas in, or sucking, the at least one web edge portion between the first roller and a second roller positioned next downstream from the first roller in the transporting direction.

Consequently, the web edge portions of polymer film traveling from a tentering device can be free from web edge curls or other unwanted deformation harmful to high quality as a product, because influence of looseness of the web edge portions can be removed effectively.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
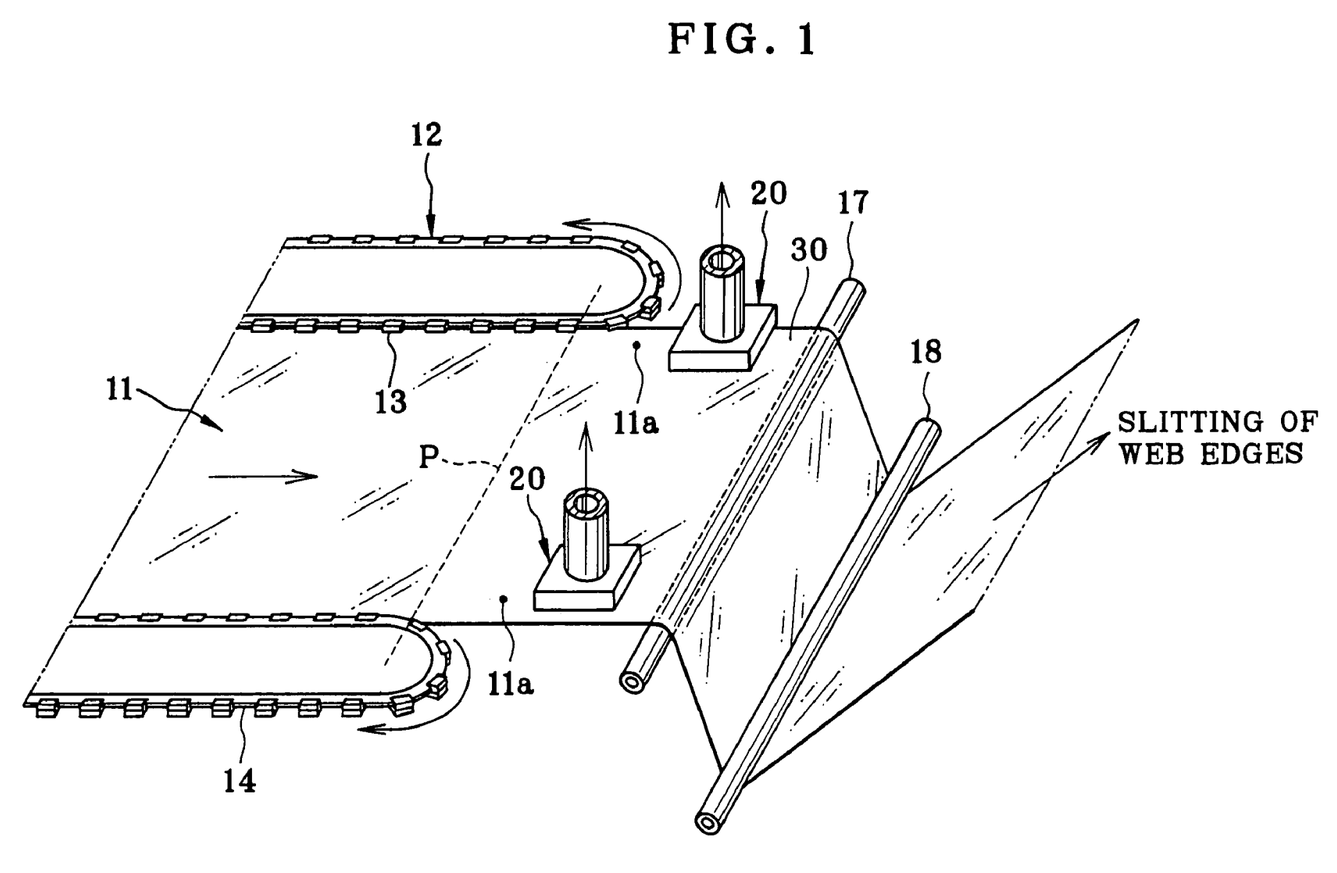
FIG. 1 is a perspective view, partially broken, illustrating a preferred embodiment with a tentering device and a first roller for polymer film.

In FIG. 1, a preferred embodiment of the invention is illustrated. Polymer film 11, for example cellulose ester film is produced by a solution casting process well-known in the art. A tentering device 12 is positioned downstream from a solution casting apparatus. Plural tenter clip mechanisms 13 in the tentering device 12 retain web edge portions 11a of the polymer film 11, which is stretched and dried while transported.

The tenter clip mechanisms 13 are automatically controlled in such a manner that upon reach to a releasing position P, the tenter clip mechanisms 13 are turned off to discontinue the retention of the polymer film 11. The polymer film 11, when moved past the releasing position P, is guided by a first roller 17 positioned next downstream from the tentering device 12, and by a second roller 18 positioned next downstream from the first roller 17, and transported to a web edge slitting process (not shown). In the web edge slitting process, the web edge portions 11a of the polymer film 11 at a respective width of 300 mm are cut away by slitting. A middle portion of the polymer film 11 is wound as a product. Note that at least one of the first and second rollers 17 and 18 may be a set of two driving rollers for nipping and transporting the polymer film 11.

Figure 2:
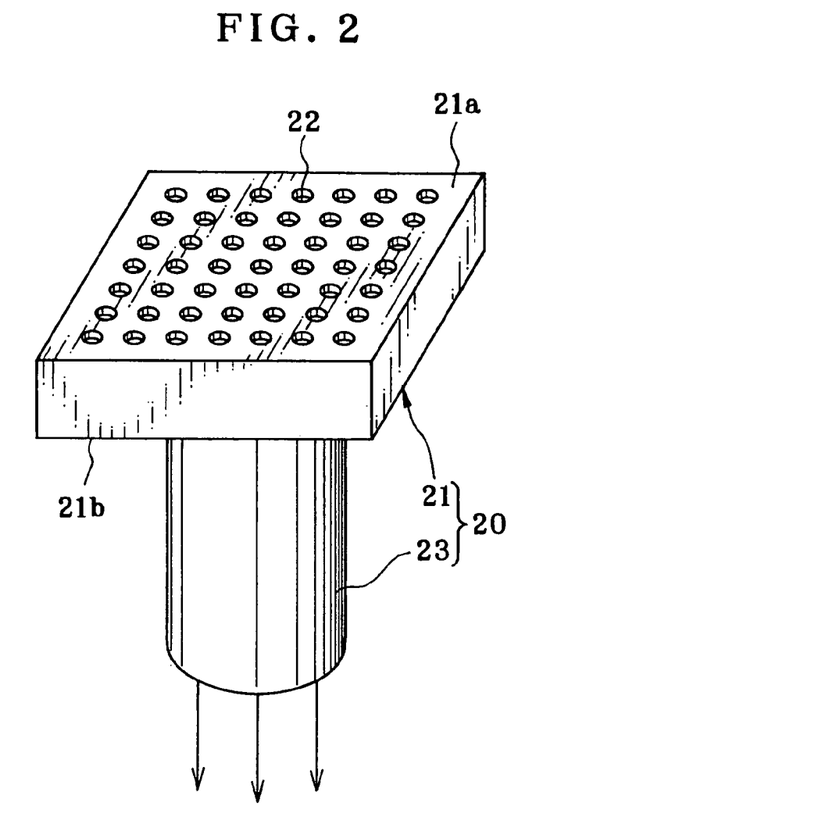
FIG. 2 is a perspective view illustrating suction nozzles.

A pair of suction nozzle units or boxes 20 with a suction blower, pump, vacuum generator, or decompression device are disposed between the releasing position P and the first roller 17, opposed to respectively the web edge portions 11a of the polymer film 11, for suction of the web edge portions 11a in a non-contact manner. In FIG. 2, each of the suction nozzle units 20 is structurally depicted. The suction nozzle units 20 have a suction box body 21 and a suction hose 23. The suction box body 21 has a small thickness. A first surface 21a of the suction box body 21 is provided with a great number of suction nozzles or openings 22. A second surface 21b of the suction box body 21 is connected with the suction hose 23. A suction blower (not shown) is connected with a remaining end of the suction hose 23. Note that the suction nozzle units 20 are opposed to an upper film surface 30 of the web edge portions 11a.

Figure 3:
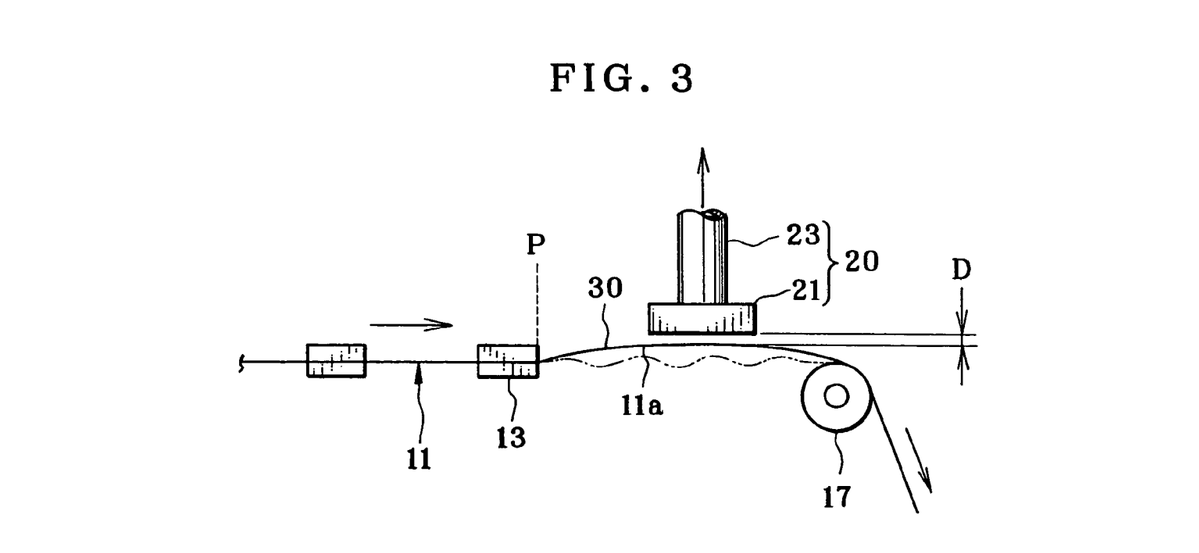
FIG. 3 is an explanatory view illustrating a relationship of the suction nozzles to web edge portions of the polymer film.

If there is no operation of the suction nozzle units or boxes 20, portions of the web edge portions 11a of the polymer film 11 downstream from the releasing position P are in a wave-like shape with curls or looseness as indicated by the phantom line in FIG. 3. When the suction nozzle units 20 start the suction, the web edge portions 11a are sucked and decurled by the suction of the suction nozzle units 20, to eliminate the curls or looseness as indicated by the solid lines. This is effective in keeping the web edge portions 11a decurled in passage at the first roller 17. Let a distance D be from the suction nozzle units 20 to the web edge portions 11a in a state during the suction of the web edge portions 11a to the suction nozzle units 20. It is preferable that the distance D is equal to or less than 10 mm in consideration of effects of the suction.

Figure 4:
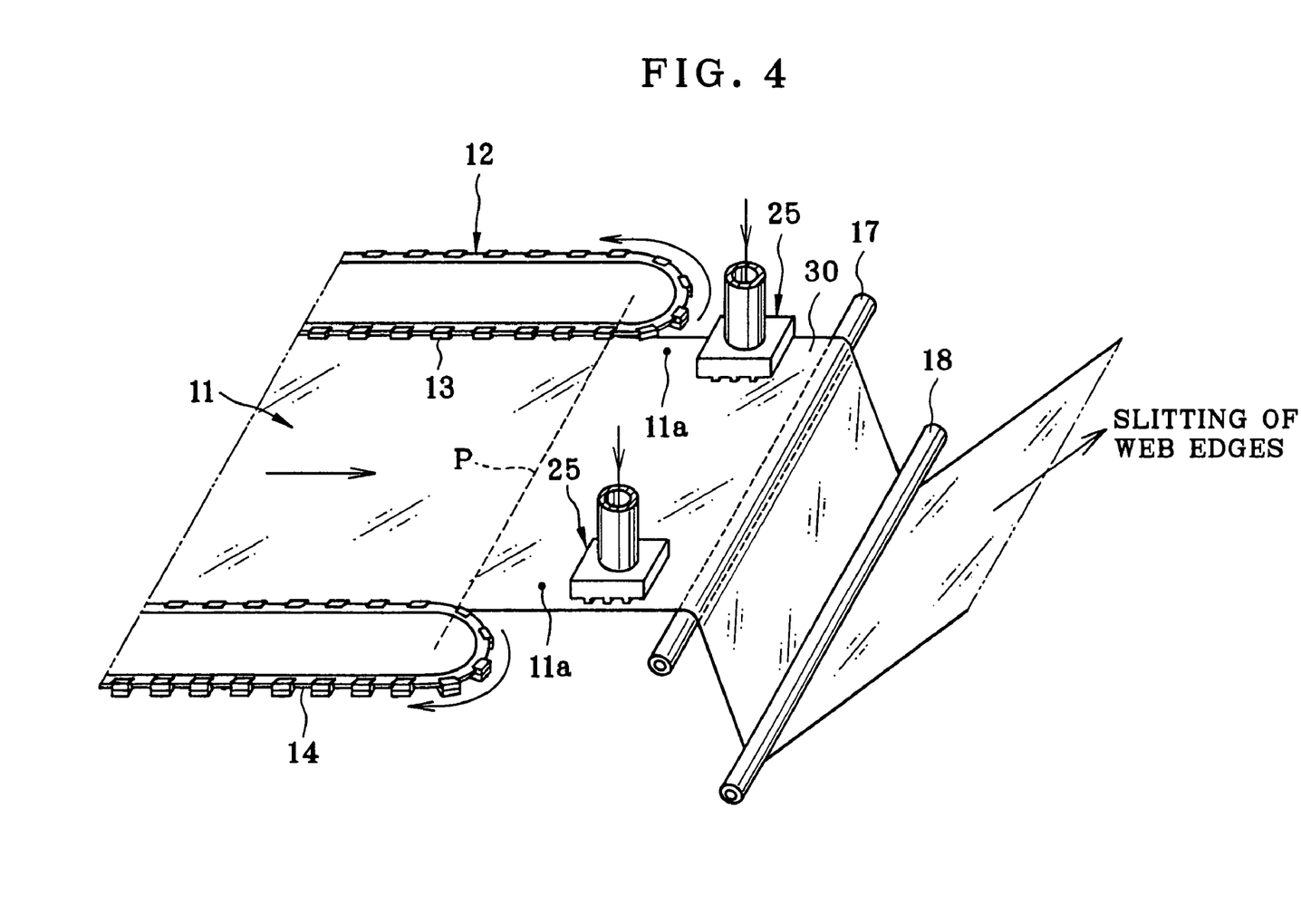
FIG. 4 is a perspective view, partially broken, illustrating one preferred embodiment with blowing nozzles.
Figure 5:
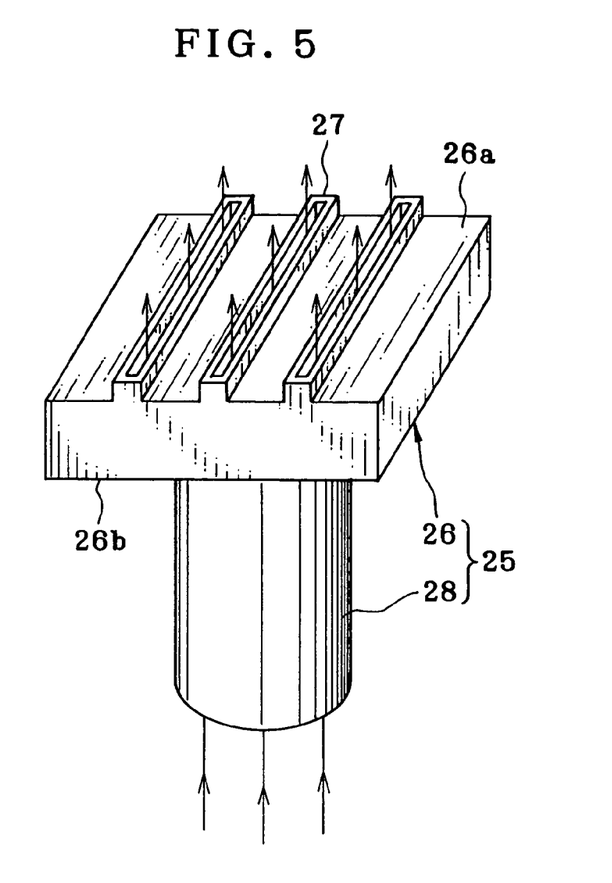
FIG. 5 is a perspective view illustrating blowing nozzles.

In FIG. 4, another preferred embodiment is illustrated. Blowing nozzle units or boxes 25 with a fan or blower are used in place of the suction nozzle units 20 of the above embodiment. In FIG. 5, the blowing nozzle units 25 includes a blowing box body 26 and a hose 28. The blowing box body 26 has a small thickness. A first surface 26a of the blowing box body 26 is provided with slit-shaped blowing nozzles 27 having lips, which are ridges projecting from edges of the slit-shaped nozzles 27. A second surface 26b of the blowing box body 26 is connected with the hose 28. The fan, blower or compressor (not shown) well-known in the art is connected with a remaining end of the hose 28, so as to cause gas or air to flow out through the slit-shaped nozzles 27 in the blowing nozzle units 25.

Figure 6:
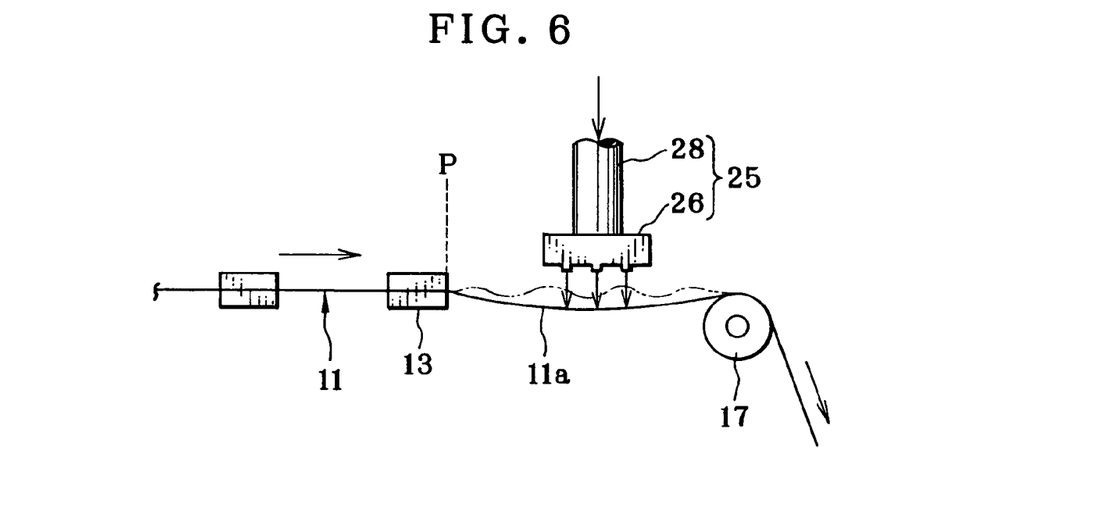
FIG. 6 is an explanatory view illustrating a relationship of the blowing nozzles to the web edge portions.

In FIG. 6, gas or air is blown in the web edge portions 11a of the polymer film 11 downstream from the releasing position P by the blowing nozzle units or boxes 25 through the slit-shaped nozzles 27. The web edge portions 11a are decurled and are free from looseness. Occurrence of folds or wrinkles in passage of the first roller 17 is prevented.

Figure 7:
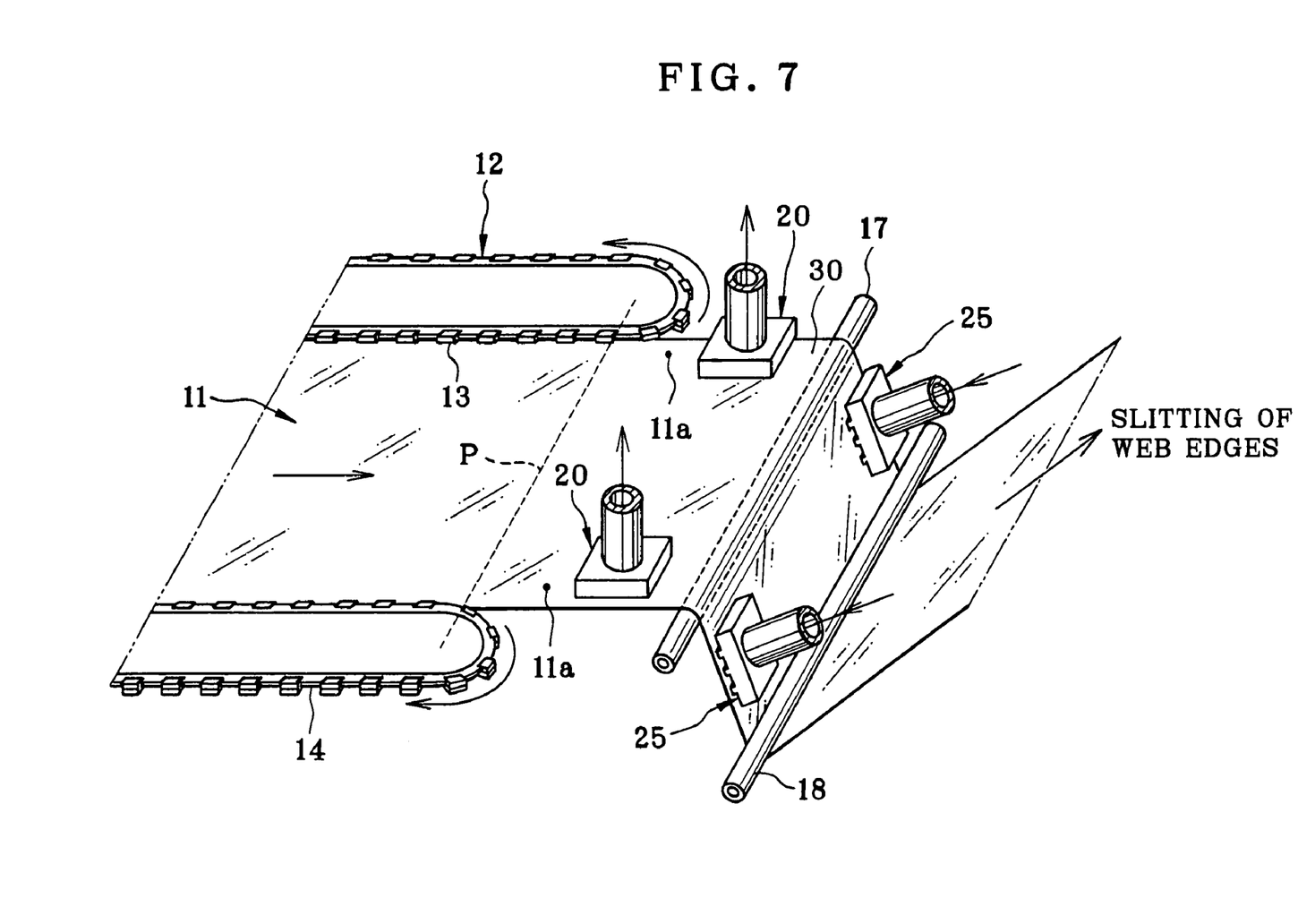
FIG. 7 is a perspective view, partially broken, illustrating still another preferred embodiment in combination of the suction nozzles and blowing nozzles.
Figure 8:
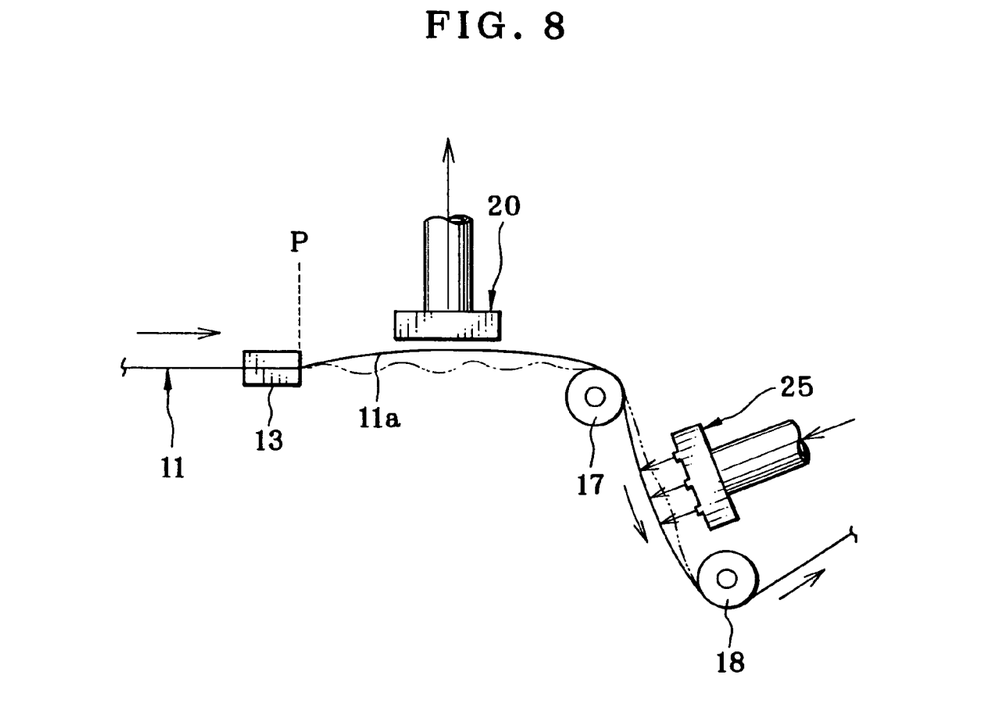
FIG. 8 is an explanatory view illustrating another preferred embodiment having suction nozzles and blowing nozzles.

Another preferred embodiment is illustrated in FIG. 7. The blowing nozzle units or boxes 25 according to the above embodiment are positioned between the first and second rollers 17 and 18. As depicted in FIG. 8, gas or air is ejected and applied to the web edge portions 11a by the blowing nozzle units 25. Even curls or looseness of the web edges remains along the web edge portions 11a of the polymer film 11 moved past the first roller 17, the web edge portions 11a are stretched and decurled. This is effective in preventing folds of web edges or wrinkles even upon movement past the second roller 18.

Further to the construction of FIGS. 7 and 8, it is possible in the film production to use the blowing nozzle units 25 between the tentering device 12 and the first roller 17 for the blowing of the web edge portions 11a, and use the suction nozzle units 20 between the first and second rollers 17 and 18 for the suction of the web edge portions 11a.

Figure 9:
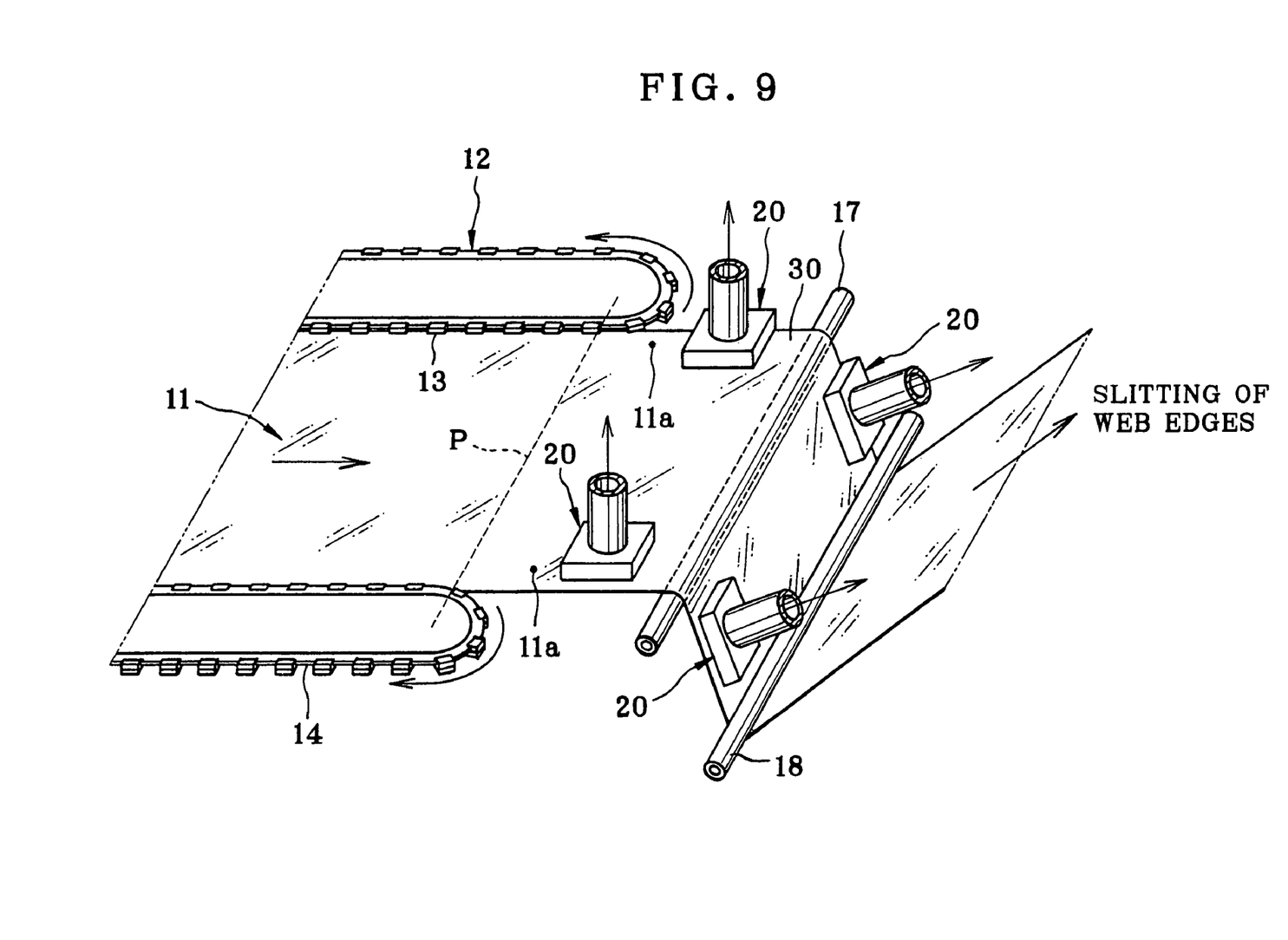
FIG. 9 is a perspective view, partially broken, illustrating one preferred embodiment in which suction nozzles are used upstream and downstream from the first roller.
Figure 10:
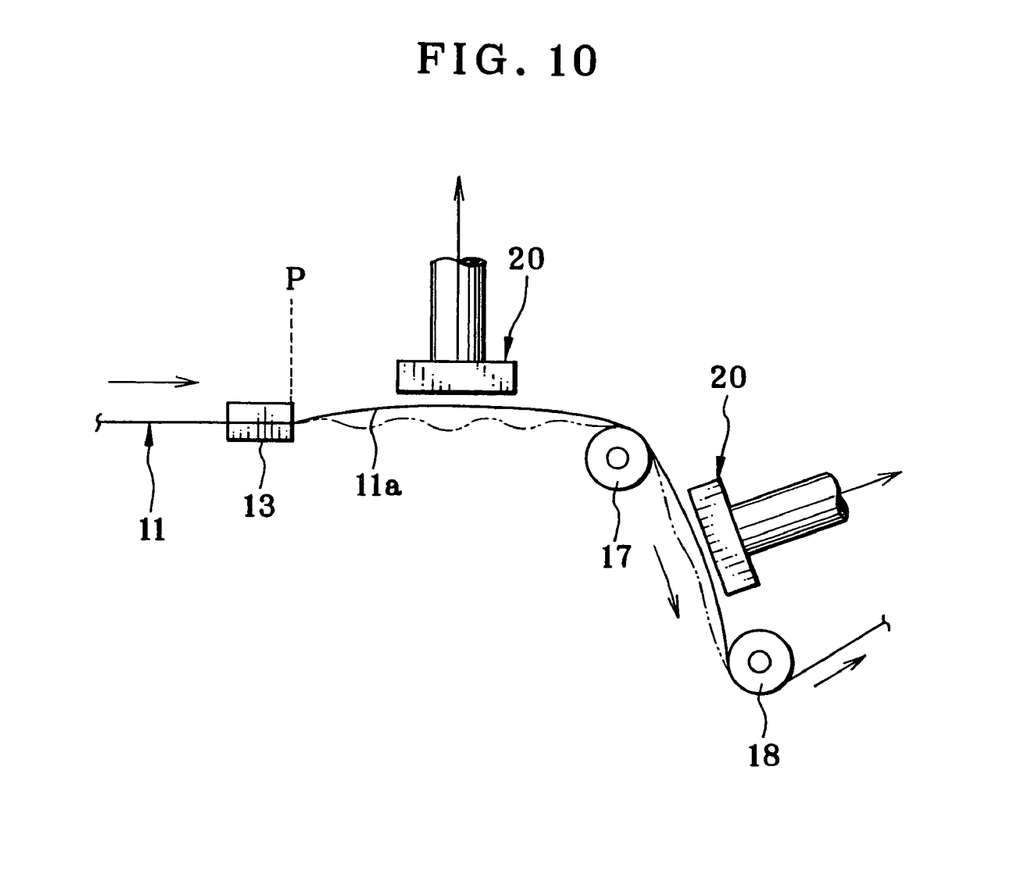
FIG. 10 is an explanatory view illustrating a relationship of the suction nozzles to the web edge portions.

Still another preferred embodiment is illustrated in FIG. 9. The suction nozzle units or boxes 20 are used in place of the blowing nozzle units 25 of FIGS. 7 and 8. Even if curls or looseness remains in the web edge portions 11a at a point downstream from the first roller 17, the web edge portions 11a can be straightened by upward suction of the suction nozzle units 20 as illustrated in FIG. 10. The web edge portions 11a can be decurled, so occurrence of folds or wrinkles at the second roller 18 is prevented.

Figure 11:
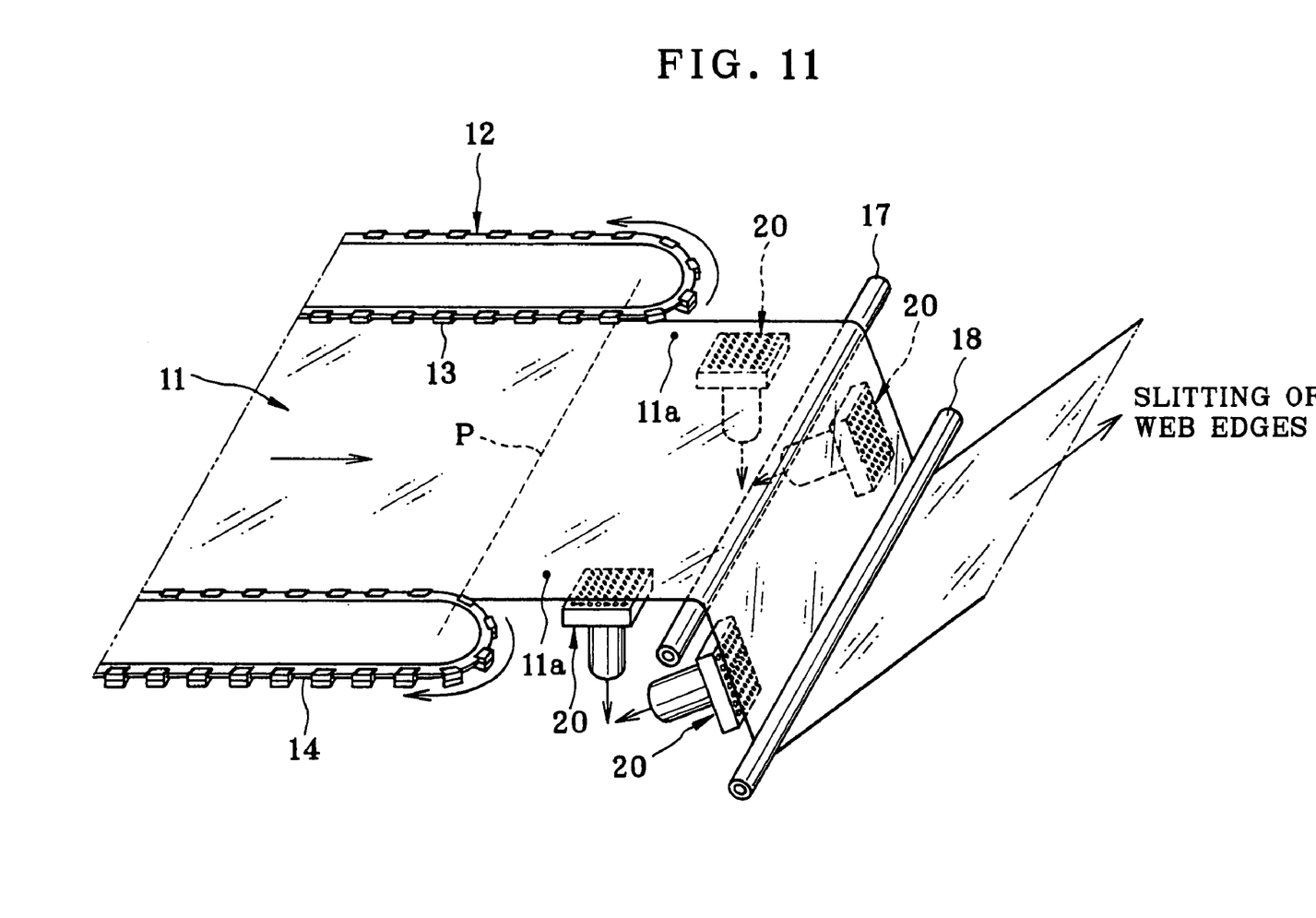
FIG. 11 is a perspective view, partially broken, illustrating another preferred embodiment in which suction nozzles are opposed to a lower film surface.
Figure 12:
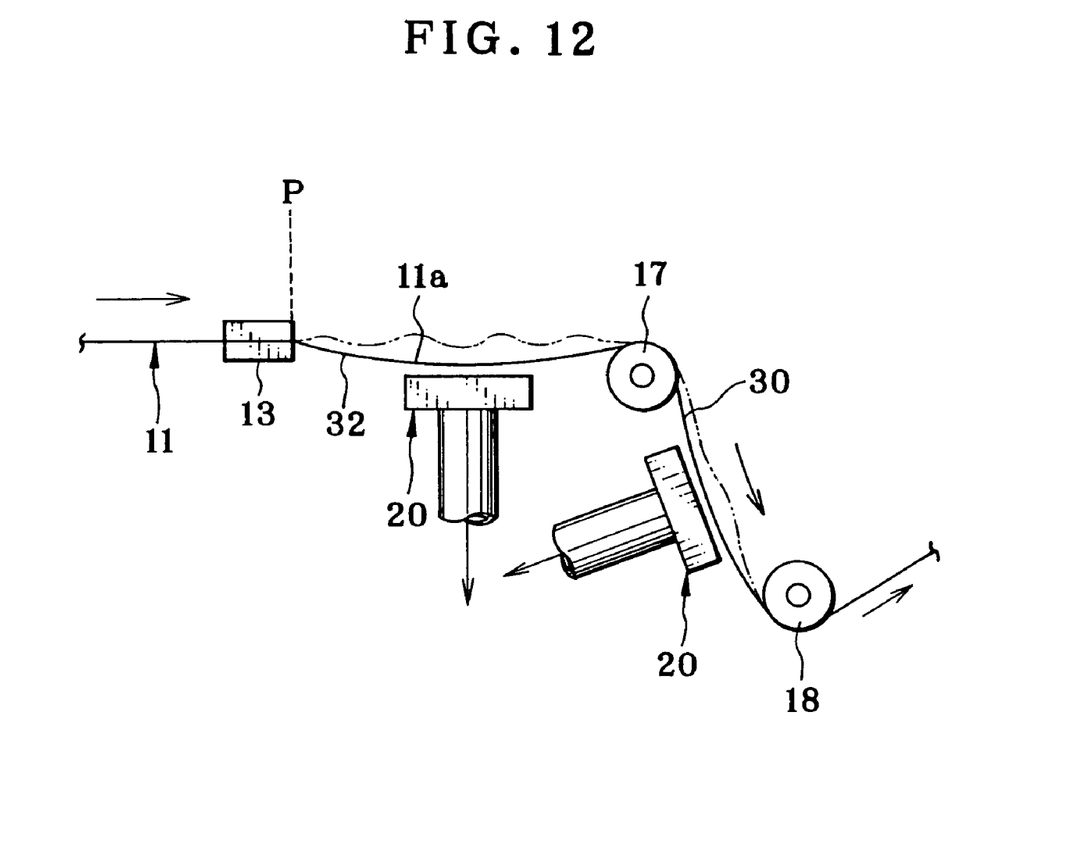
FIG. 12 is an explanatory view illustrating a relationship of the suction nozzles to the web edge portions.

Another preferred embodiment is illustrated in FIGS. 11 and 12. A lower film surface 32 of the polymer film 11 is opposite to the upper film surface 30. The suction nozzle units or boxes 20 of the above embodiment are modified and in positions opposed to the lower film surface 32. The web edge portions 11a are sucked down by the suction nozzle units 20 in a direction opposite to that according to FIG. 9.

Furthermore, it is possible in the film production to blow the lower film surface 32 in the web edge portions 11a with gas or air.

In the above embodiments, the suction box body 21 of the suction nozzle units or boxes 20 and the blowing box body 26 of the blowing nozzle units 25 are box-shaped with plane surfaces. However, the suction nozzle units 20 or the blowing nozzle units 25 can have a box body with curved surfaces, for example an arc-shaped surface with a somewhat great radius in compliance with a loosely curved surface of the polymer film.

In the above embodiments, the nozzles are used for the suction. However, other constructed suction units may be used, for example a suction unit of a long shape including two rollers and a box-shaped suction chamber. The two rollers are disposed to extend in parallel with one another, and support or transport the polymer film. The box-shaped suction chamber is disposed behind the rollers, and exerts force to suck the polymer film through a space between the rollers.

In the above embodiment, the tenter clip mechanisms 13 are used in the tentering device 12. However, the tentering device 12 can be a pin type including pin units for retention. In the above, the two suction nozzle units or boxes 20 and the two blowing nozzle units 25 are used for both the web edge portions 11a of the polymer film 11. However, only one of the suction nozzle units 20, the blowing nozzle units 25 may be installed for one web edge portion 11a. This is typically effective when only one web edge portion 11a has curls or looseness of a web edge, owing to web characteristics.

In the above embodiment, the example of the polymer is cellulose ester, specifically cellulose triacetate. However, other examples of polymers can be used for producing the film, including polyesters, such as polyethylene terephthalate, polybutylene terephthalate, polyethylene-2,6-naphthalate; and polyolefins, such as polyethylene. Furthermore, polymers can be polystyrene, polyvinyl chloride, poly vinylidene chloride, polycarbonate, polyamides, polyimides, and the like.

EXAMPLES

Experiments were conducted by creating Examples 1–6. As a commonly basic condition, cellulose triacetate film was produced by solution casting. Examples of raw materials of cellulose triacetate in use were cotton linters. However, it is possible for raw materials to use wood pulp, and a mixture of cotton linters and wood pulp.

For the solution in the casting of the polymer film 11, various solvents known in the art can be used for dope of the polymer film 11. Examples of the solvents include hydrocarbon halides, alcohols, ethers, esters, and ketones, and combinations of two or more of those. Also, additives of various kinds may be included in the material for the polymer film 11. Examples of the additives include plasticizers, ultraviolet absorbers, dyes, optical anisotropic compounds, matt agents, and the like.

The polymer film 11 immediately released from the tentering device 12 had tension of the transport of approximately 150 N per width, had a width of 1,570 mm, and was transported at a moving speed of 50 m/min. An effective size in a web width direction of a range of the suction and the air blowing was 200 mm, which was approximately 13% of the web width or polymer film width of the polymer film 11.

Note that the term of the effective size means a width of a region in the polymer film 11 receiving force of the suction or blowing of air. The effective size is closely related to a size of the suction nozzle units or boxes 20 or the blowing nozzle units 25 in the direction of the polymer film width of the polymer film 11, but is changeable according to a distance of the nozzles to the polymer film 11. If the distance of the polymer film 11 from the suction nozzle units 20 or the blowing nozzle units 25 is somewhat small, the effective size is regarded equal to the size of the suction nozzle units 20 or the blowing nozzle units 25 in the web width direction.

If the effective size is too great, effects of decurling the web edge portions 11a will be low. Energy required for those effects will be very high in the system. Also, scratches or other additional problems are likely to occur. As a result of considering this situation, a value of the effective size was found less than 25% of the polymer film width of the polymer film 11, preferably 20% of the polymer film width, and desirably 15% of the polymer film width.

The pressure of the suction nozzle units or boxes 20 for the suction and of the blowing nozzle units 25 for blowing are correlated to the tension of the polymer film 11 being transported, and should be determined for decurling the web edge portions 11a, and preventing unwanted offsetting movement of the polymer film 11 and of the web edge portions 11a.

The suction nozzle units or boxes 20 and the blowing nozzle units 25 were kept from contacting the web edge portions 11a of the polymer film 11. This non-contact arrangement makes it unnecessary to change the conditions in association with film types, because influence to the size or shape according to curls or looseness in the web edge portions 11a is very low. If changes in the conditions are desired, it is possible to change only the pressure of the suction or blowing of air for suitable adjustment.

A distance of the suction nozzle units or boxes 20 or the blowing nozzle units 25 to the web edge portions 11a can be determined as desired in view of specific dimensions. However, excessive highness of the nozzle distance lowers the effects of the suction or blowing of air. Accordingly, a distance from the suction nozzle units 20 to the web edge portions 11a in operation was set 10 mm or less. In relation to the blowing nozzle units 25, there is a problem in that the blowing nozzle units 25 is likely to contact the web edge portions 11a upon stopping the air blowing. Thus, the distance from the blowing nozzle units 25 to the polymer film 11 in a non-operating state was set approximately 10 mm.

Example 1

The construction was according to FIGS. 1–3, in which the polymer film 11 had a film thickness of 40 microns, and suction pressure of the suction nozzle units or boxes 20 was −100 Pa. As a result, it was observed that no folds of web edges or wrinkles occurred in the web edge portions 11a.

Example 2

Example 1 was repeated but with differences in that the polymer film 11 had a film thickness of 80 microns, and suction pressure of the suction nozzle units 20 was −150 Pa. As a result, it was observed that no folds of web edges or wrinkles occurred in the web edge portions 11a.

Example 3

The construction was according to FIGS. 4–6, in which the polymer film 11 had a film thickness of 40 microns, and pressure of the blowing nozzle units 25 for air blowing was 600 Pa. As a result, it was observed that no folds of web edges or wrinkles occurred in the web edge portions 11a.

Example 4

The construction was according to FIGS. 7 and 8, in which the polymer film 11 had a film thickness of 40 microns, the suction nozzle units 20 had the suction pressure of −100 Pa, and the pressure of the blowing of the blowing nozzle units 25 was 600 Pa. As a result, it was observed that no folds of web edges or wrinkles occurred in the web edge portions 11a.

Example 5

The construction was according to FIG. 9, in which the polymer film 11 had a film thickness of 80 microns, the upstream one of the suction nozzle units 20 had the suction pressure of −150 Pa, and the downstream one of the suction nozzle units 20 had the suction pressure of −200 Pa. As a result, it was observed that no folds of web edges or wrinkles occurred in the web edge portions 11a.

Example 6

The construction was according to FIGS. 11 and 12, in which the polymer film 11 had a film thickness of 40 microns, and the suction nozzle units 20 had the suction pressure of −100 Pa. As a result, it was observed that no folds of web edges or wrinkles occurred in the web edge portions 11a.

Comparative Example 1

Example 1 was repeated but with differences in the suction nozzle units or boxes 20 and the blowing nozzle units 25 were eliminated. As a result, folds of web edge or wrinkles occurred at the first roller 17. Failure in the transport occurred, to break the polymer film 11 into plural pieces.

Comparative Example 2

Example 2 was repeated except that the suction nozzle units 20 and the blowing nozzle units 25 were omitted. As a result, folds of web edge or wrinkles occurred at a remarkable amount that was smaller than that of the result of the Comparative Example 1. However, no breakage of the polymer film 11 into plural pieces occurred. The web edge portions 11a were eliminated by slitting operation of the polymer film 11 in the web edge slitting process so as to obtain a product that could be shipped as a saleable state.

According to the results of the Examples 1–6 and the Comparative Examples 1 and 2, the present invention was found to be effective in preventing occurrence of curls or looseness in the polymer film by use of the suction nozzle units 20 and/or the blowing nozzle units 25. Folds or wrinkles due to the curls or looseness were prevented even upon passage of the rollers positioned downstream from the tentering device.

In relation to various industrial uses of the invention, optical films can be produced with great advantages of the invention as well as the production of the polymer films. Also, protective films for polarizing plates in a liquid crystal display device, and EL (electroluminescence) films of organic types, can be produced effectively.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A polymer film producing method of producing polymer film by use of a solution casting system including a tentering device, comprising a step of:

blowing gas in, or sucking, a film surface of at least one of web edge portions of said polymer film within a section from a downstream end of said tentering device to a first roller that said polymer film contacts first.

2. A polymer film producing method as defined in claim 1, further comprising a step of blowing gas in, or sucking, said film surface between said first roller and a second roller, positioned downstream from said first roller in a transporting direction of said polymer film, for contacting said polymer film.

3. A polymer film producing method as defined in claim 1, wherein a ratio of a size of at least one web edge portion for being blown or sucked relative to a polymer film width of said polymer film is smaller than 25% in a direction of said polymer film width.

4. A polymer film producing method as defined in claim 3, wherein said ratio is smaller than 15%.

5. A polymer film producing method as defined in claim 3, wherein said blowing or said sucking is simultaneous between said web edge portions.

6. A polymer film producing method as defined in claim 5, wherein said polymer film moves out of said tentering device at a moving speed equal to or more than 45 m/min.

7. A polymer film producing method as defined in claim 5, wherein said polymer film has said polymer film width equal to or more than 1,400 mm and equal to or less than 1,800 mm in moving out of said tentering device.

8. A polymer film producing method as defined in claim 5, wherein said polymer film has a film thickness equal to or more than 20 microns and equal to or less than 120 microns in moving out of said tentering device.

9. A polymer film producing method as defined in claim 5, wherein said polymer film comprises cellulose ester film.

10. A polymer film producing method as defined in claim 5, wherein said tentering device includes a pair of tenter clip mechanisms for retaining respectively said web edge portions to tenter said polymer film.

11. A polymer film producing method as defined in claim 5, wherein said sucking is through a nozzle unit having plural suction nozzles or openings disposed two-dimensionally.

12. A polymer film producing method as defined in claim 5, wherein said blowing is through a nozzle unit having plural slit-shaped blowing nozzles disposed respectively to extend crosswise to a transporting direction of said polymer film.

* * * * *